No. 887,370. PATENTED MAY 12, 1908.
A. WINTON & H. B. ANDERSON.
CARBURETER.
APPLICATION FILED JUNE 23, 1906.
2 SHEETS—SHEET 1.
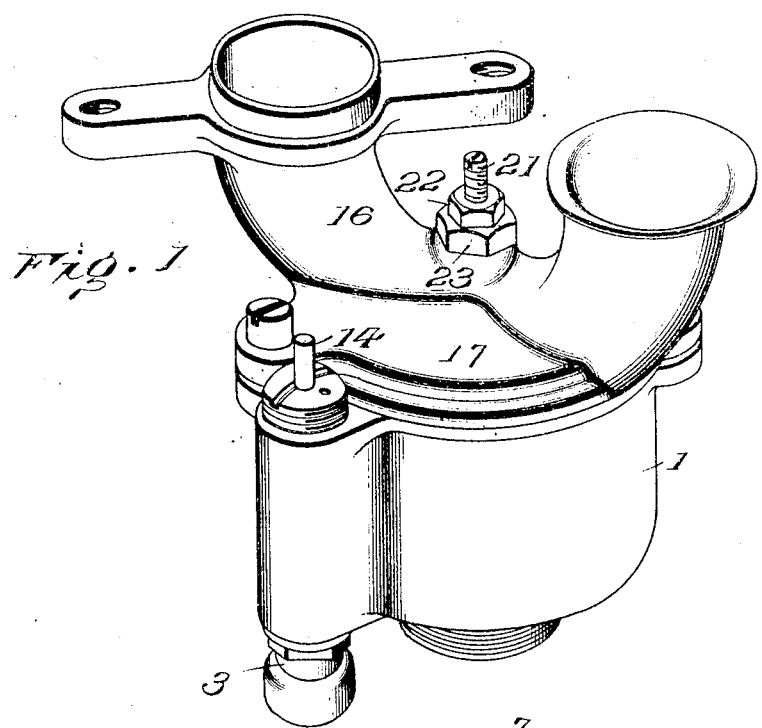
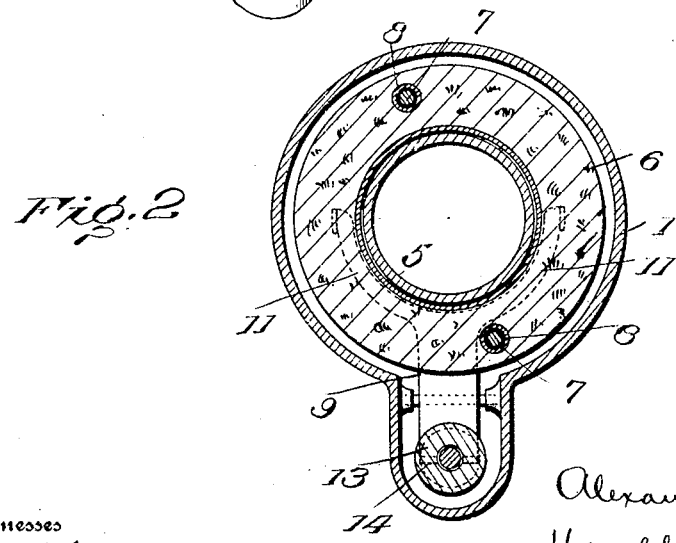
Witnesses
L. H. Schmidt
E. P. Wright Jr.
Inventors
Alexander Winton,
Harold B. Anderson
By A. S. Pattison
Attorney No. 887,370. PATENTED MAY 12, 1908.
A. WINTON & H. B. ANDERSON.
CARBURETER.
APPLICATION FILED JUNE 23, 1906.
2 SHEETS—SHEET 2.
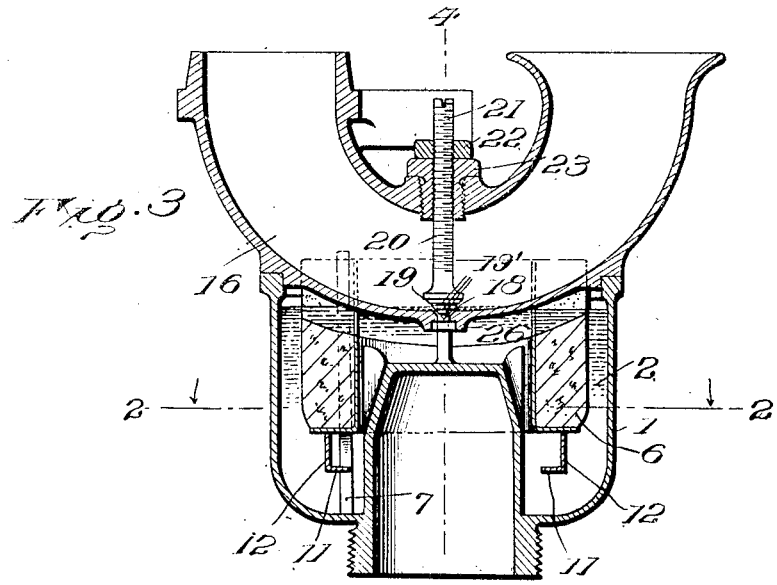
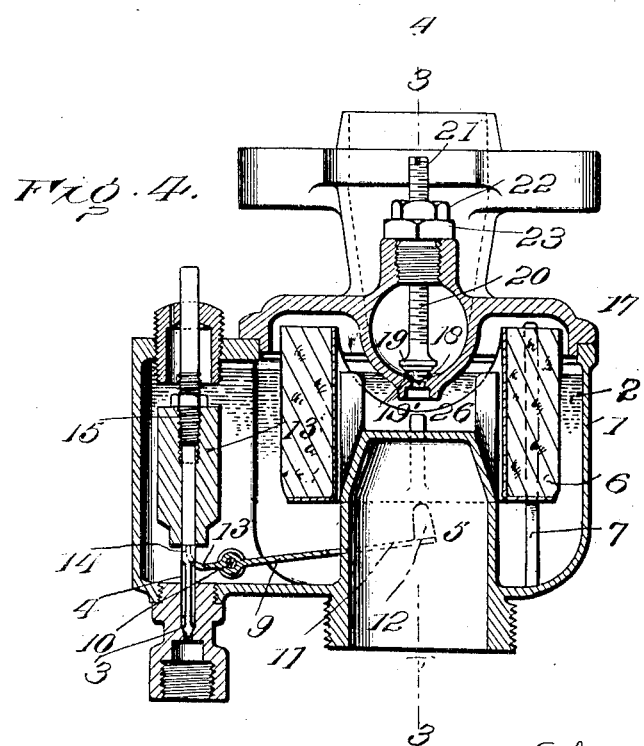
Witnesses
J. H. Schmidt,
C. R. Wright, Jr.
Inventor,
Alexander Winton,
Harold B. Anderson,
By A. S. Pattison
Attorney

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

CARBURETER.

No. 887,370.   Specification of Letters Patent.   Patented May 12, 1908.

Application filed June 23, 1906. Serial No. 323,117.

To all whom it may concern:

Be it known that we, ALEXANDER WINTON and HAROLD B. ANDERSON, citizens of the United States, residing at Cleveland, in the county of Cuyahoga and State of Ohio, have invented certain new and useful Improvements in Carbureters, of which the following is a specification, reference being had therein to the accompanying drawing.

This invention relates to improvements in carbureters, for explosive engines, and is of the "float type" wherein the gasolene is maintained at a predetermined height by a float controlled valve.

One object of this invention is to provide a carbureter constructed to act as a surface carbureter when the engine is running at a low speed, and automatically act as a nozzle carbureter when the engine is running at high speed.

Another object is to provide a carbureter so constructed that a single air passage provides a proper supply to the carbureter for all speeds of the engine, and to avoid the necessity for an additional or auxiliary air passage controlled by a valve operated automatically or otherwise.

In the accompanying drawings, Figure 1, is a perspective view of a carbureter embodying the invention. Fig. 2, is a horizontal section on the line 2—2 of Fig. 3, looking in the direction indicated by arrow. Fig. 3, is a vertical central section on the line 3—3, Fig. 4, looking in the direction indicated by arrow. Fig. 4, is a vertical central section on line 4—4 of Fig. 3.

In carrying out this invention, a casing 1 constitutes a float and gasolene chamber 2. A gasolene supply inlet 3 is in communication with the chamber 2, and this inlet is controlled by a float-controlled needle-valve 4. The area of the chamber 2 is preferably (though not necessarily) reduced by a central extension 5, and the float 6 is annular in form, and surrounds the extension, as shown in Figs. 2 and 4. This annular float 6 is preferably held in position as it moves vertically under the influence of the inflowing gasolene through the medium of the two vertically disposed guide rods 7, which pass loosely through the vertical openings 8 in the float 6.

A lever 9 is pivoted at the point 10 near its outer end, and has its inner end provided with two arms 11, the ends of the arms having upwardly-projecting ears 12 which engage the under side of the float 6, as shown in Figs. 3 and 4. The outer end of this lever is preferably forked as shown at 13, to straddle the needle-valve 4, and the ends of this fork 13 are turned up, as shown at 14, and engage the under side of the adjustable weight 15 which is upon and carried by the needle valve.

The operation of the float and needle-valve for keeping the fluid or gasolene at a predetermined level, is well understood, and need not be described. By adjusting the weight upon the needle-valve the level of the gasolene can be regulated. Thus far, only a well known construction has been described.

This present improvement will now be explained.

An air passage-way 16 extends across the upper portion of the casing 1 and chamber 2, and is preferably of a curved or U-shape as shown in Figs. 1 and 3. As shown in Figs. 3 and 4, the lowest portion of this air passage dips or projects into the chamber 2, and preferably this air passage has its walls formed as a part of the cover 17 of the chamber, by being cast or formed therewith, as shown in Figs. 1, 3 and 4, though it may be formed separate therefrom without departing from the spirit of the invention. The bottom of this U-shaped passage 16 forms a holder-shaped wall for the gasolene, and the fluid level is preferably slightly above or substantially in the horizontal plane of the inner surface of the bottom of said holder-shaped wall.

A gasolene exit opening 18 is formed in the lowest portion of the air passage 16, and this is controlled by an adjustable valve 19 which has its screw-threaded stem 20 passing through the upper wall of the air passage and projecting to the outside, as at 21, where it is accessible for adjustment. A locking nut 22, serves to lock the valve in its adjusted position.

Attention is directed to the fact that the valve 19 is located outside of the outlet 18, and that the gasolene passing out of this outlet strikes the cone-shaped end of the valve, which has an advantageous result when the carbureter is not acting as a surface carbureter, which will be pointed out in detail hereinafter. It will be noted that the cone-shaped valve 19 is larger than the valve stem, and to enable the valve to be placed in position and removed, the screw-threaded stem 20 passes through a flanged nut 23 which may be removed and thus permit the placing and removal of the valve.

Especial attention is called to the fact that the air passage 16 is made smaller in cross-sectional area or restricted at the point where the gasolene enters the air passage, the object of which will be fully explained presently.

In the operation of the carbureter, the gasolene level is set so that the gasolene enters the air passage approximately as shown by dotted lines in Fig. 3, and that the lower wall of the air passage forms the bottom of a gasolene holder so that when the engine is running at low speed, the air passes directly in contact with and over a relatively large surface of fluid gasolene, and the device then acts as a surface carbureter. At high speeds, the gasolene is sucked through the orifice 18, but even in this latter instance the level of the gasolene is so high that the gasolene is not lifted.

The reason for restricting the air passage where the gasolene enters, is to give sufficient velocity to the air at low speeds to produce the proper mixture for good combustion. It is found in practice that this restriction permits an ample flow of air to the engine when running at high speed. By this restriction sufficient velocity of air is obtained for low speeds, and ample volume of air for high speeds.

When the engine is working at low speed, the gasolene enters the lower portion of the contracted part of the air passage, and the device works as a surface carbureter, but when the engine is running at high speed, the gasolene is used sufficiently rapid to prevent it entering the air passage fast enough and the device then acts as a suction or nozzle carbureter, the gasolene being drawn through the orifice 18. Since the level of the gasolene is normally above the outlet 18, the gasolene (when the device is not working as a surface carbureter) does not have to be lifted in the sense in which it is lifted in the usual form of nozzle or suction acting carbureter.

When the gasolene is being drawn through the orifice 18 due to the high speed of the engine, the location and cone-shape of the valve causes the gasolene to be spread outward into an umbrella shape, which breaks it up and materially aids in making a thorough mixture thereof with the air passing through the air passage.

From the foregoing it will be noted that the construction is such that the device provides a proper supply of gasolene and air at all various speeds of the engine, and without the necessity of varying either the supply of gasolene or air, and without the necessity of any auxiliary air valve against which the engine must work.

Having disclosed what is believed to be a new principle of operation for a carbureter, whereby certain advantages of operation are obtained, and whereby simplicity of construction is possible, other specific forms for practicing the invention disclosed will occur to those skilled in the art, and therefore the invention is not restricted to the particular form here shown, so long as the principle of operation here disclosed is performed in such other devised form or forms.

A short tubular section or portion 26 is provided and always projects into the gasolene, so that if for any reason the level of the gasolene should be a trifle below the lowest portion of the air passage, it will prevent the sucking of air instead of gasolene.

The valve 19 is corrugated or grooved, as shown at 19' for the purpose of atomizing the gasolene by impact when the engine is running at high speed.

The restricted fluid orifice 18 permits the fluid to flow fast enough by gravity to maintain a body of fluid within the holder-shaped bottom of the air passage 16, for small fluid consumption (low speeds), but not fast enough to supply the fluid by gravity feed for large fluid consumption (high speeds), and in the latter event the fluid is drawn through the restricted orifice causing spray or jet carburization.

Having thus described our invention, what we claim and desire to secure by Letters Patent, is:—

1. A carbureter, comprising means for maintaining a fluid level, an air passage having its lower wall projecting into said level to form a fluid holder, said wall provided with a fluid orifice in a plane below said fluid level, the orifice so restricted as to require spray action from said orifice within the air passage for increased fluid supply to the increased volume of air passing therethrough.

2. A carbureter for explosive engines, comprising an air passage having a fluid holder-shaped bottom with a restricted orifice through the bottom of the holder-shaped portion, means adapted to maintain an air-exposed body of fluid within the holder-shaped portion by gravity-feed through said orifice, the orifice being so restricted as to require suction-feed of the fluid therethrough and therefore spray action when relatively large consumption of fluid occurs.

3. A carbureter for explosive engines, comprising an air passage having a fluid holder-shaped bottom with an inlet orifice in its bottom so restricted as to permit gravity feed for small fuel consumption only, and means adapted to maintain a fluid level within the holder-shaped portion by gravity feed for small fuel consumption only.

4. A carbureter, having a fluid chamber, a fluid supply therefor, means for maintaining a fluid level in the chamber, and a U-shaped air passage extending across the top of the chamber with the lower wall of the U extending into the chamber below the fluid level, said lower wall having a fluid inlet orifice below said fluid level and in communication with said chamber.

5. A carbureter, having a fluid chamber, a fluid supply for the chamber, means for maintaining a fluid level in said chamber, a U-shaped air passage extending across the top of the chamber with its lower wall in a plane below the fluid level, the lower wall having a fluid inlet orifice in communication with the chamber.

6. A carbureter, having a fluid chamber, a fluid supply, means for maintaining a fluid level in said chamber, an air passage extending across the upper portion of said chamber with its lower wall in a plane below said fluid level, the lower wall of the passage having a fluid inlet orifice at a point below the maintained fluid level in communication with said chamber, the walls of said orifice extending into the chamber for the purpose described.

7. A carbureter comprising a fluid chamber, means for maintaining a fluid level in said chamber, a detachable cover for the chamber carrying a U-shaped air passage with its lower wall dipping into and below the said fluid level, the said lower wall having an inlet orifice at a point below the fluid level and in communication therewith.

8. A carbureter, having automatically alternately fluid surface and suction action, comprising an air passage-way, and fluid feeding means maintaining therein by gravity flow a body or puddle of fluid exposed to surface contact of the passing air for slow fluid consumption, said fluid feeding means being restricted to cause suction and spray carburization for rapid fluid consumption.

9. A carbureter comprising a reservoir, means for maintaining a constant level of gasolene in the reservoir, and a U-shaped conduit for air having its lower portion arranged in the reservoir, below said constant level of gasolene, and having an aperture in its bottom for enabling the gasolene to seek its level in the conduit.

10. A carbureter comprising a reservoir, means for maintaining a constant level of gasolene in the reservoir, a U-shaped conduit for air having its lower portion arranged in the reservoir below said constant level of gasolene, and having an aperture in its bottom for enabling the gasolene to seek its level in the conduit, and a screw extending through the upper portion of the conduit, and controlling and regulating communication between said aperture and the interior of the conduit.

In testimony whereof we affix our signatures in presence of two witnesses.

ALEXANDER WINTON.
HAROLD B. ANDERSON.

Witnesses:
W. J. WARD,
R. HAGERLING.